(12) United States Patent
Park et al.

(10) Patent No.: US 10,673,068 B2
(45) Date of Patent: Jun. 2, 2020

(54) NEGATIVE ELECTRODE ACTIVE MATERIAL HAVING IMPROVED OUTPUT CHARACTERISTICS AND ELECTRODE FOR ELECTROCHEMICAL DEVICE INCLUDING THE NEGATIVE ELECTRODE ACTIVE MATERIAL

(71) Applicant: LG Chem, Ltd., Seoul (KR)

(72) Inventors: Min-A Park, Daejeon (KR); Dae-Hong Kim, Daejeon (KR); Jae-Kyung Kim, Daejeon (KR); Won-Hee Jeong, Daejeon (KR)

(73) Assignee: LG Chem, Ltd. (KR)

( * ) Notice: Subject to any disclaimer, the term of this patent is extended or adjusted under 35 U.S.C. 154(b) by 130 days.

(21) Appl. No.: 15/753,055

(22) PCT Filed: Dec. 26, 2016

(86) PCT No.: PCT/KR2016/015295
§ 371 (c)(1),
(2) Date: Feb. 15, 2018

(87) PCT Pub. No.: WO2017/111566
PCT Pub. Date: Jun. 29, 2017

(65) Prior Publication Data
US 2018/0233741 A1    Aug. 16, 2018

(30) Foreign Application Priority Data

Dec. 24, 2015    (KR) .................. 10-2015-0186546

(51) Int. Cl.
*H01M 4/36*    (2006.01)
*H01M 4/485*    (2010.01)
(Continued)

(52) U.S. Cl.
CPC .............. *H01M 4/366* (2013.01); *C01F 7/02* (2013.01); *C01G 23/005* (2013.01); *H01G 11/04* (2013.01);
(Continued)

(58) Field of Classification Search
CPC .......... H01M 4/36; H01M 4/48; H01M 4/485; H01G 11/28; H01G 11/46; H01G 11/04; H01G 11/52
See application file for complete search history.

(56) References Cited

U.S. PATENT DOCUMENTS 9,059,451 B2    6/2015    Xiao et al.
2003/0138697 A1    7/2003    Leising et al.
(Continued)

FOREIGN PATENT DOCUMENTS

EP    2565161 A1    3/2013
JP    2004039620 A    2/2004
(Continued)

OTHER PUBLICATIONS

Dongjoon Ahn et al., "Enhanced Rate Capability of Oxide Coated Lithium Titanate within Extended Voltage Ranges", Frontiers in Energy Research, Jun. 2015, vol. 3, XP055467166.
(Continued)

*Primary Examiner* — Kenneth J Douyette
(74) *Attorney, Agent, or Firm* — Lerner, David, Littenberg, Krumholz & Mentlik, LLP

(57) ABSTRACT

The present disclosure relates to a negative electrode active material having excellent output characteristics and causing little gas generation, and an electrode including the negative electrode active material. The negative electrode active material includes metal oxide-lithium titanium oxide (MO-LTO) composite particles which have a shape of secondary particles formed by aggregation of primary particles,
(Continued)

wherein the primary particles have a core-shell structure including a core and a shell totally or at least partially covering the surface of the core, the core includes primary particles of lithium titanium oxide (LTO), and the shell includes a metal oxide.

8 Claims, 3 Drawing Sheets

(51) Int. Cl.

| | | |
|---|---|---|
| H01M 4/48 | (2010.01) | |
| H01G 11/28 | (2013.01) | |
| H01G 11/46 | (2013.01) | |
| H01G 11/04 | (2013.01) | |
| H01M 4/131 | (2010.01) | |
| H01M 10/0525 | (2010.01) | |
| H01M 10/052 | (2010.01) | |
| H01M 4/62 | (2006.01) | |
| C01F 7/02 | (2006.01) | |
| C01G 23/00 | (2006.01) | |
| H01G 11/52 | (2013.01) | |
| H01G 11/86 | (2013.01) | |
| H01M 4/02 | (2006.01) | |

(52) U.S. Cl.
CPC .............. *H01G 11/28* (2013.01); *H01G 11/46* (2013.01); *H01G 11/52* (2013.01); *H01G 11/86* (2013.01); *H01M 4/131* (2013.01); *H01M 4/483* (2013.01); *H01M 4/485* (2013.01); *H01M 4/628* (2013.01); *H01M 10/052* (2013.01); *H01M 10/0525* (2013.01); *C01P 2004/84* (2013.01); *C01P 2006/40* (2013.01); *H01M 2004/021* (2013.01); *H01M 2004/027* (2013.01)

(56) References Cited

U.S. PATENT DOCUMENTS

| | | | |
|---|---|---|---|
| 2007/0281211 | A1 | 12/2007 | Zhang et al. |
| 2011/0262811 | A1* | 10/2011 | Kinoshita ............. H01M 4/131 |
| | | | 429/217 |
| 2014/0045060 | A1 | 2/2014 | Park et al. |
| 2015/0180023 | A1* | 6/2015 | Xiao ..................... H01M 4/366 |
| | | | 429/231 |
| 2015/0303482 | A1 | 10/2015 | Buqa et al. |
| 2015/0318530 | A1* | 11/2015 | Yushin .................. H01M 4/628 |
| | | | 429/131 |
| 2016/0190574 | A1 | 6/2016 | Nagai et al. |

FOREIGN PATENT DOCUMENTS

| | | | |
|---|---|---|---|
| JP | 2012123952 | A | 6/2012 |
| JP | 2014086164 | A | 5/2014 |
| KR | 20130038518 | A | 4/2013 |
| KR | 20130055080 | A | 5/2013 |
| KR | 20140009927 | A | 1/2014 |
| KR | 20140022253 | A | 2/2014 |
| KR | 20150025047 | A | 3/2015 |
| KR | 20150090075 | A | 8/2015 |
| WO | 2012169331 | A1 | 12/2012 |
| WO | 2014170656 | A1 | 10/2014 |
| WO | 2015025795 | A1 | 2/2015 |

OTHER PUBLICATIONS

Extended European Search Report for Application No. EP16879433.7 dated Apr. 24, 2018.
Search report from International Application No. PCT/KR2016/015295, dated Mar. 24, 2017.

* cited by examiner

NEGATIVE ELECTRODE ACTIVE MATERIAL HAVING IMPROVED OUTPUT CHARACTERISTICS AND ELECTRODE FOR ELECTROCHEMICAL DEVICE INCLUDING THE NEGATIVE ELECTRODE ACTIVE MATERIAL

CROSS-REFERENCE TO RELATED APPLICATION

This application is a national phase entry under 35 U.S.C. § 371 of International Application No. PCT/KR2016/015295 filed Dec. 26, 2016, which claims priority to Korean Patent Application No. 10-2015-0186546 filed on Dec. 24, 2015, the disclosures of which are incorporated herein by reference.

TECHNICAL FIELD

The present disclosure relates to a negative electrode active material and an electrode for an electrochemical device including the negative electrode active material. More particularly, the present disclosure relates to a negative electrode active material having excellent output characteristics and causing little gas generation, and an electrode including the negative electrode active material.

BACKGROUND ART

Since lithium secondary batteries spotlighted recently as power sources for compact electronic instruments use an organic electrolyte, they show a discharge voltage at least 2 times higher than that of the conventional battery using an aqueous alkaline solution, and thus show high energy density.

The conventional lithium secondary battery uses, as a negative electrode active material, a carbonaceous material capable of reversible lithium ion intercalation/deintercalation, while maintaining structural and electrical properties as a negative electrode active material. However, as portable compact electronic instruments have been functionalized diversely and have undergone downsizing and weight lightening, it is required for lithium secondary batteries to have high capacity. Therefore, many attentions have been given to a graphite-based negative electrode material having a higher theoretical capacity than that of graphite (372 mAh/g) used conventionally as a negative electrode material for a lithium secondary battery.

As a negative electrode material other than a carbonaceous material, there is a silicon-based metallic material. Such a silicon-based metallic material is an active material having a theoretical capacity at least 10 times higher than that of graphite, and thus active studies about the material have been conducted. However, such a silicon-based metallic material has not been commercialized yet, because there are problems in that volumetric swelling of silicon particles and a volumetric change occurring during a charge cycle causes cracking, resulting in degradation of conductivity between active material particles, separation of an active material from an electrode plate and continuous reaction with an electrolyte, and thus degradation of life characteristics of a lithium secondary battery.

In addition, there have been increasing studies about lithium metal oxides, particularly a lithium titanium oxide (LTO), having a high charging rate. It is known that a lithium metal oxide has a small particle size and a large specific surface area to allow high rate charge/discharge, shows an excessively low structural change during charge/discharge and zero-strain, provides excellent life characteristics, forms a relatively high voltage range, causes no formation of dendrites, and thus has excellent safety and stability.

However, since a lithium metal oxide shows lower electroconductivity and capacity as compared to a carbonaceous material and has a non-uniform particle shape, it is not mixed homogeneously with a binder and conductive material to be mixed together during the manufacture of a negative electrode.

Therefore, when the content of a binder is increased in order to increase the adhesion, the content of a conductive material or that of an active material is decreased relatively, resulting in degradation of electroconductivity and capacity of a battery. On the contrary, when the content of a conductive material is increased, the electroconductivity of an electrode and high-rate charge characteristics are improved but the adhesion between lithium metal oxide and a current collector is decreased, thereby making it difficult to realize desired performance.

Further, there is a disadvantage in that the diffusion rate of lithium ions in an active material is low. To solve the problem, LTO particles are prepared to have a small particle size less than 1 μm. However, in this case, LTO has an increased specific surface area and requires a large amount of binder, and has a difficulty in dispersion. Therefore, there have been suggested secondary particles formed by aggregation of primary particles. However, the pore size and distribution in the particles are not uniform, thereby causing excess or deficiency of an electrolyte and non-uniformity in availability of an active material.

Under these circumstances, there is a need for a negative electrode material which overcomes the disadvantages of a lithium titanium oxide and has low internal resistance, high electroconductivity and excellent output characteristics.

DISCLOSURE

Technical Problem

The present disclosure is directed to providing a negative electrode active material which has excellent input/output characteristics and causes little gas generation during the use of a battery. The present disclosure is also directed to providing an electrode for an electrochemical device including the negative electrode active material. These and other objects and advantages of the present disclosure may be understood from the following detailed description and will become more fully apparent from the exemplary embodiments of the present disclosure. Also, it will be easily understood that the objects and advantages of the present disclosure may be realized by the means or methods shown in the appended claims and combinations thereof.

Technical Solution

In one aspect, the present disclosure relates to composite particles designed to solve the problems of the related art.

According to a first embodiment, there are provided metal oxide-lithium titanium oxide (MO-LTO) composite particles which have a shape of secondary particles formed by aggregation of primary particles, wherein the primary particles have a core-shell structure including a core and a shell totally or at least partially covering the surface of the core, the core includes primary particles of lithium titanium oxide (LTO), and the shell includes a metal oxide.

According to a second embodiment, there are provided the MO-LTO composite particles of the first embodiment, wherein the primary particles of lithium titanium oxide (LTO) has a chemical composition represented by the following Chemical Formula 1:

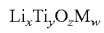   [Chemical Formula 1]

Wherein M is any one selected from the group consisting of Zr, B, Sn, S, Be, Ge and Zn, or a combination of two or more of them, $0.5 \leq x \leq 3$, $1 \leq y \leq 5$, $2 \leq z \leq 12$, and $0 \leq w < 0.1$.

According to a third embodiment, there are provided the MO-LTO composite particles of the first or the second embodiment, wherein the metal oxide is an oxide of a metal selected from the group consisting of Al, Zr, B, Li and Ti.

According to a fourth embodiment, there are provided the MO-LTO composite particles of any one of the first to the third embodiments, wherein the metal oxide is at least one selected from the group consisting of $Al_2O_3$ and $ZrO_2$.

According to a fifth embodiment, there are provided the MO-LTO composite particles of any one of the first to fourth embodiments, wherein the primary particles have a $D_{50}$ (volume-based density distribution) of 0.1-1 μm.

According to a sixth embodiment, there are provided the MO-LTO composite particles of any one of the first to fifth embodiments, wherein the secondary particles have a $D_{50}$ (volume-based density distribution) of 2-50 μm.

In another aspect, the present disclosure relates to a negative electrode for an electrochemical device. According to a seventh embodiment, there is provided a negative electrode which includes a current collector and an electrode active material layer formed on at least one surface of the current collector, wherein the electrode active material layer includes the MO-LTO composite particles as defined in any one the first to the sixth embodiments.

According to an eighth embodiment, there is provided the negative electrode for an electrochemical device of the seventh embodiment, wherein the electrode active material layer includes the MO-LTO composite particles and the content of secondary particles thereof is 80 wt % or more.

According to a ninth embodiment, there is provided an electrochemical device which includes a negative electrode, a positive electrode, a separator interposed between the negative electrode and the positive electrode and an electrolyte, wherein the negative electrode is defined in the seventh or the eighth embodiment.

According to a tenth embodiment, there is provided the electrochemical device of the ninth embodiment, which is a lithium ion secondary battery or a hybrid super capacitor.

Advantageous Effects

In the negative electrode including a lithium titanium oxide according to the present disclosure, the surface of lithium titanium oxide (LTO) particles is coated with a metal oxide, such as $Al_2O_3$ or $ZrO_2$, so that the amount of gas generated during the use of a battery may be reduced. In addition, since the surface of the active material is coated with the metal oxide, LTO has decreased internal resistance and shows high electroconductivity, thereby providing excellent output characteristics.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing. Meanwhile, the shapes, sizes, scales or proportions of some elements in the drawings may be exaggerated for the purpose of clearer description.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one aspect, there are provided metal oxide-lithium titanium oxide composite particles (MO-LTO composite particles) which can be used as a negative electrode material for an electrochemical device. According to an embodiment of the present disclosure, the MO-LTO composite particles are coated with a metal oxide totally or at least partially on the surface of LTO particles.

According to an embodiment of the present disclosure, the composite particles may be in a shape of primary particles. In addition, the composite particles may have a shape of secondary particles formed by aggregation of the primary particles. According to an embodiment of the present disclosure, the composite particles include secondary particles. The primary particles include LTO primary particles coated with a metal oxide totally or at least partially on the surface thereof. According to the present disclosure, the secondary particles may form composite particles in a shape of primary particles aggregated physically with each other, or may form composite particles through chemical bonding.

Herein, primary particles or secondary particles may have a spherical or pseudo-spherical shape, and the term 'pseudo-spherical' refers to a shape having a three-dimensional volume, including an elliptical shape, and covers any types of particles, such as amorphous particles whose shape cannot be specified.

Composite Primary Particles

Figure 1:
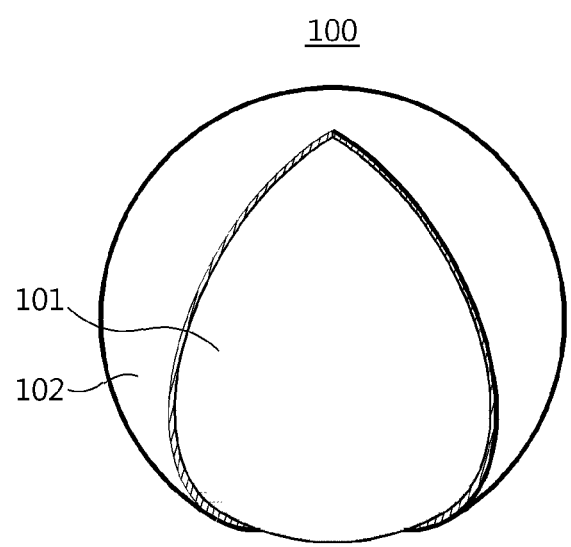
FIG. 1 is a schematic view illustrating MO-LTO primary particles according to the present disclosure.

FIG. 1 is a schematic view illustrating the primary particles having a core-shell structure in the metal oxide-lithium titanium oxide composite particles (MO-LTO composite particles) according to the present disclosure. Referring to FIG. 1, the primary particles have a core-shell structure including a core portion and a shell portion totally or at least partially covering the surface of the core portion. According to an embodiment of the present disclosure, the core portion includes LTO primary particles and the shell portion includes a metal oxide.

According to an embodiment of the present disclosure, the primary particles of lithium titanium oxide (LTO) have a chemical composition represented by the following Chemical Formula 1:

$$Li_xTi_yO_zM_w$$ [Chemical Formula 1]

wherein M is any one selected from the group consisting of Zr, B, Sn, S, Be, Ge and Zn, or a combination of two or more of them, $0.5 \leq x \leq 3$, $1 \leq y \leq 5$, $2 \leq z \leq 12$, and $0 \leq w < 0.1$.

For example, the LTO may be $Li_{0.8}Ti_{2.2}O_4$, $Li_{2.67}Ti_{1.33}O_4$, $Li_{1.33}Ti_{1.67}O_4$, $Li_{1.14}Ti_{1.71}O_4$, $Li_4Ti_5O_{12}$, $LiTi_2O_4$, $Li_2TiO_3$, or the like. More particularly, the LTO may be $Li_{1.33}Ti_{1.67}O_4$ or $LiTi_2O_4$ which undergoes little change in crystal structure during charge/discharge and has a spinel structure, but is not limited thereto.

In addition, the core portion is coated with a shell portion containing a metal oxide totally or partially on the surface thereof.

According to an embodiment of the present disclosure, the metal oxide may be an oxide of metal selected from Al, Zr, B, Li and T, and non-limiting examples of the metal oxide may include $Al_2O_3$ and/or $ZrO_2$.

According to an embodiment of the present disclosure, the primary particles may have a $D_{50}$ (volume-based density distribution) of 0.1-1 μm. As used herein, $D_{50}$, which is volume-based density distribution, means a particle diameter of particles corresponding to 50% based on the total volume when accumulating volume measurements of particle diameters from smaller particles.

Composite Secondary Particles According to the present disclosure, the composite particles include composite secondary particles formed by coarsening of MO-LTO composite primary particles.

According to an embodiment of the present disclosure, the MO-LTO composite secondary particles have a $D_{50}$ (volume-based density distribution) of 2-50 μm. When the particle size is smaller than the above-defined range, the particles aggregate with each other and thus the electrode mixture formed during the manufacture of an electrode may not be dispersed uniformly on the surface of a current collector and may be localized in the electrode. Meanwhile, when the particle size is larger than the above-defined range, the pore size of an electrode increases excessively, resulting in an increase in internal resistance and degradation of output characteristics.

The MO-LTO composite secondary particles have a porous structure including a plurality of pores on the surface and in the body of the particles, wherein the pores include those unique to the primary particles and those formed between the aggregated primary particles. Two or more pores may be interconnected. As used herein, the term 'pores unique to the primary particles' refers to those formed on the surface and in the body of the primary particles.

According to an embodiment of the present disclosure, the MO-LTO composite secondary particles include mesopores having a diameter of 1 μm or more. Preferably, the mesopores are present in an amount of 10-50 vol % based on 100 vol % of the pores of the composite secondary particles. When the mesopores are present in an amount less than 10 vol %, impregnation efficiency with an electrolyte is degraded and the number of Li ions dissociated around the particles is decreased, thereby adversely affecting output characteristics. On the other hand, when the mesopores are present in an amount larger than 50 vol %, energy density of the resultant secondary battery may be degraded and the distance between particles is increased excessively, resulting in degradation of output characteristics.

In addition, according to an embodiment of the present disclosure, the composite secondary particles have a pore volume of 0.01-1 $cm^3/g$.

Method for Preparing Composite Particles

Hereinafter, a method for preparing the MO-LTO composite particles will be explained. The method described hereinafter is an exemplary embodiment of various methods for preparing MO-LTO composite particles, and the scope of the present disclosure is not limited thereto.

According to an embodiment of the present disclosure, the method for preparing the composite particles includes the steps of: (S1) preparing LTO primary particles; and (S2) coating the resultant LTO primary particles with a metal oxide to form primary particles having a core-shell structure. In addition, in order to obtain composite secondary particles, the method may further include step (S3) of subjecting the resultant primary particles to a coarsening process to form composite particles as secondary particles.

Step (S1) may be carried out through the conventional liquid phase processes generally known to those skilled in the art, such as a coprecipitation process, sol-gel process or a hydrothermal process, but is not limited thereto.

Next, the LTO primary particles obtained from step (S1) is mixed mechanically with a metal oxide to form primary particles having a core-shell structure. The mechanical mixing is based on the principle of generating surface energy through mechanical energy and carrying out coating by adhering and/or fusing interfaces having high surface energy with each other. For example, the mechanical mixing may be carried out by any one process selected from ball milling, mechanofusion milling, shaker milling, planetary milling and attritor milling, disk milling, shape milling, nauta milling, nobilta milling and high speed mixing, or a combination thereof, but is not limited thereto. The mechanical mixing may be carried out at a rotation speed of 500-7000 rpm. According to an embodiment of the present disclosure, a heat treatment step may be carried out optionally in addition to the mechanical mixing step.

The primary particles obtained as described above may be subjected to spray drying and coarsening to obtain secondary particles. As spray drying systems, conventional spray drying systems may be used. Particular examples of such systems may include but are not limited to an ultrasonic wave spray drying system, air nozzle spray drying system, ultrasonic wave nozzle spray drying system, filter expansion liquid droplet generation system or an electrostatic spray drying system. In addition, a baking step may be further carried out at a temperature of 450-600° C.

In another aspect, there is provided a negative electrode for an electrochemical device which includes the MO-LTO composite particles according to the present disclosure as a negative electrode active material. The negative electrode includes a negative electrode current collector and a negative electrode active material layer formed on at least one surface of the current collector, wherein the negative electrode active material layer includes the negative electrode active material, a conductive material and a binder resin at a weight ratio of 80-90:7-13:3-9.

According to an embodiment of the present disclosure, the negative electrode active material layer includes MO-LTO composite particles as a negative electrode active material. The MO-LTO composite particles may include non-aggregated and isolated primary particles besides the secondary particles, but preferably include the composite particles in the form of secondary particles, which are present in an amount of 80 wt % or more, 90 wt % or more, or 99 wt % or more.

According to an embodiment of the present disclosure, the negative electrode active material layer has a porous structure including a plurality of pores. When the negative electrode active material layer has excessively low porosity, the pore volume is excessively small, resulting in degradation of ion and/or electron conductivity. On the other hand, when the negative electrode active material layer has excessively high porosity, the negative electrode has excessively high porosity, and thus may show an insufficient loading amount of active material based on the area of the negative electrode or may have a large distance between active material particles to cause degradation of conductivity.

Besides the above-described composite particles, the negative electrode active material may further include any one active material or two or more active materials selected from the group consisting of carbonaceous materials, transition metal oxides, and Si-based and Sn-based active materials used conventionally as negative electrode active materials.

Non-limiting examples of the binder resin include but are not limited to any one selected from polyvinylidene fluoride-co-hexafluoropropylene, polytetrafluoroethylene (PTFE), polyvinylidene fluoride (PVDF), carboxymethyl cellulose (CMC), polyvinyl alcohol (PVA), polyvinyl butyral (PVB), poly-N-vinylpyrrolidoen (PVP), styrene-butadiene rubber (SBR), polyamide-imide and polyimide, or a combination of two or more of them.

There is no particular limitation in the conductive material, as long as it is an electroconductive material causing no chemical change. Particular examples of the conductive material include natural graphite, artificial graphite, carbon black, acetylene black, ketjen black, Super-P black, carbon fibers, and metal powder or metal fibers such as copper, nickel, aluminum, silver, or the like.

According to an embodiment of the present disclosure, the negative electrode may be manufactured by the method as described below. First, a negative active material, a binder resin and a conductive material are dispersed into a suitable solvent, such as an organic solvent (e.g. ethanol (EtOH), acetone, isopropyl alcohol, N-methyl pyrrolidone (NMP) or propylene glycol (PG)) or water to provide negative electrode slurry. Next, the slurry is pressurized to form an electrode. Otherwise, the slurry is coated on metal foil as a current collector to form an electrode shape, or a composition for a negative electrode is rolled with a roller to form a sheet, which is attached to metal foil to form an electrode shape. Then, the resultant electrode shape is dried at a temperature of 100-350° C. to form a negative electrode. More particularly, shaping of the negative electrode slurry may be carried out by compressing the negative electrode slurry by using a roll press molding machine. The roll press molding machine is for use in improving electrode density and controlling electrode thickness through rolling, and includes a top roll, a bottom roll, a controller capable of controlling the roll thickness and heating temperature, and a winding unit for winding and dewinding an electrode. While a roll-shaped electrode passes through the roll press, a rolling process is carried out. Then, the rolled electrode is wound back into a roll shape to finish an electrode. Herein, the press preferably carries out compression at a pressure of 5-20 ton/cm² and the roll has a temperature of 0-150° C. Then, the slurry subjected to the above-mentioned compression process using a press is dried. The drying step is carried out at a temperature of 100-350° C., preferably 150-300° C. Herein, when the drying temperature is less than 100° C., it is difficult to carry out solvent evaporation undesirably. On the contrary, high-temperature drying at a temperature higher than 350° C. is not preferred due to a possibility of oxidation of the conductive material. Therefore, it is preferred that the drying temperature is 100° C. or higher and does not exceed 350° C. In addition, the drying step is preferably carried out at the above-defined temperature for about 10 minutes-6 hours. Such a drying step carries out drying (solvent evaporation) of the shaped negative electrode composition while allowing binding of powder particles with each other, thereby improving the strength of the negative electrode.

In still another aspect, there is provided a lithium ion secondary battery or hybrid super capacitor including the negative electrode obtained as described above. A lithium ion secondary battery generally includes a unit cell including a negative electrode, a positive electrode, a separator interposed between the positive electrode and the negative electrode, and an electrolyte. In still another aspect, there is provided a negative electrode for a lithium ion battery or hybrid super capacitor including the negative electrode obtained as described above.

In still another aspect, there is provided an electrochemical device including the composite particles as a negative electrode active material. For example, the electrochemical device may be a lithium ion secondary battery or hybrid super capacitor, but is not limited thereto. Hereinafter, the electrochemical device will be explained in more detail with reference to a lithium ion secondary battery.

The lithium ion secondary battery generally includes a unit cell including a negative electrode, a positive electrode, a separator interposed between the positive electrode and the negative electrode, and an electrolyte.

See the above description with reference to the negative electrode. According to an embodiment of the present disclosure, the positive electrode may include a lithium-containing transition metal oxide as a positive electrode active material. Particular examples of the lithium-containing transition metal oxide include any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_b$-$Mn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, O≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3) and $Li_xFePO_4$ (0.5<x<1.3), or a combination of two or more of them. The lithium-containing transition metal oxide may be coated with a metal, such as aluminum (Al) or metal oxide. Besides the lithium-containing transition metal oxide, sulfide, selenide and halide may also be used. Preferably, a high-voltage positive electrode may be used. The high-voltage positive electrode includes, as a positive electrode active material, at least one selected from lithium nickel-manganese-cobalt composite oxides, lithium manganese oxides and lithium manganese metal composite oxides, which have a spinel structure and are high-potential oxides.

The separator generally has a shape of porous membrane having a plurality of pores. There is no particular limitation in the porous separator and such a porous separator may be manufactured in the form of a film, non-woven web or woven web according to the method generally known to those skilled in the art. Non-limiting examples of the separator include a film, non-woven web or woven-web made of at least one polymer or a mixture of two or more polymers selected from the group consisting of polyethylene, polypropylene, polyethylene terephthalate, polybutylene terephthalate, polyester, polyacetal, polyamide, polycarbonate, polyimide, polyetherether ketone, polyarylether ketone, polyetherimide, polyamideimide, polybenzimidazole, polyether sulfone, polyphenylene oxide, cyclic olefin copolymer, polyphenylene sulfide and polyethylene naphthalene.

As known to those skilled in the art, the porous separator may further include a porous coating layer including inorganic particles and a binder. The inorganic particles is selected from the group consisting of inorganic particles having a dielectric constant of about 5 or more, inorganic particles capable of transporting lithium ions and a combination thereof. The binder may include any one selected from the group consisting of polyvinylidene fluoride (PVDF), polyacrylic acid (PAA), polyethylene glycol (PEG), polypropylene glycol (PPG), toluene diisocyanate (TDI), polymethyl methacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate propionate, cyanoethylpullulan, cyanoethylpolyvinylalchol, cyanoethyl cellulose, cyanoethyl sucrose, pullulan, carboxymethyl cellulose (CMC), acrylonitrile-styrene-butadiene copolymer, polyimide, polyvinylidene fluoride, polyacrylonitrile and styrene butadiene rubber (SBR), or a combination of two or more of them, but is not limited thereto.

The electrolyte that may be used according to the present disclosure is a salt having a structure of $A^+B^-$, wherein $A^+$ includes an alkali metal cation such as $Li^+$, $Na^+$, $K^+$ or a combination thereof, preferably $Li^+$ ion. $B^-$ includes an anion, such as $F^-$, $Cl^-$, $Br^-$, $I^-$, $NO_3^-$, $BF_4^-$, $PF_6^-$, $N(CN)_2^-$, $SCN$, $ClO_4^-$, $AsF_6^-$, $CF_3SO_3^-$, $(CF_3SO_2)_2^-$, $C(CF_2SO_2)_3^-$, $(CF_3)_3PF_3^-$, $(CF_3)4PF_2^-$, $(CF_3)_5PF^-$, $(CF_3)_6P^-$, $(CF_3CF_2SO_2^-)_2N$, $(CF_3SO_2)_2N^-$, $CF_3SO_3^-$, $CF_3CF_2(CF_3)_2CO^-$, $(CF_3SO_2)_2CH^-$, $(CF_3SO_2)_3C^-$, $CF_3(CF_2)_7SO_3^-$, $CF_3CO_2^-$, $CH_3CO_2^-$, or a combination thereof. Preferably, the salt having such a structure of $A^+B^-$ is a lithium salt.

The salt having a structure of $A^+B^-$ is dissolved or dissociated in an organic solvent. Non-limiting examples of the organic solvent include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofurane, N-methyl-2-pyrrolidone (NMP), ethyl methyl carbonate (EMC), γ-butyrolactone, or a mixture thereof.

In yet another aspect, there is provided a battery module including the lithium ion secondary battery as a unit battery, and a battery pack including the battery module. The battery pack may be used as a power source for a device requiring high-temperature stability, excellent cycle characteristics and high-rate characteristics. Particular examples of such devices include but are not limited to: power tools driven by the power of an electric motor; electric cars, including electric vehicles (EV), hybrid electric vehicles (HEV), plug-in hybrid electric vehicles (PHEV), or the like; electric two-wheeled cars including electric bikes (E-bikes) and electric scooters (E-scooters); electric golf carts; electric power storage systems; or the like.

The present disclosure has been described in detail with reference to the preferred embodiments of the present disclosure. However, it should be understood that the preferred embodiments are for illustrative purposes only and not intended to limit the scope of this disclosure. In addition, it will be apparent to those skilled in the art that various changes and modifications may be made without departing from the scope of the present disclosure. Therefore, it should be understood that the scope of the present disclosure is defined by the following claims and is not limited to the description of the specification, and other equivalents and modifications could be made thereto without departing from the scope of the disclosure.

EXAMPLES

Preparation of MO-LTO Composite Particles $TiO_2$ (purity 99.0 wt %, particle diameter: about 10 μm) and $Li_2CO_3$ (purity 99.0 wt %, particle diameter: about 10 μm) were used and introduced to water as a dispersion medium so that the Li/Ti ratio may be 0.80, and then pulverized and mixed by using a vibratory mill to obtain slurry. The slurry was baked at a temperature of about 800° C. to obtain primary particles of lithium titanium oxide ($Li_4Ti_5O_{12}$). Next, the particles were pulverized and sieved so that the particle diameter may be 0.5-1 μm.

The obtained primary particles of lithium titanium oxide ($Li_4Ti_5O_{12}$) and $Al_2O_3$ powder (purity 99.0 wt %, particle diameter: 5 μm) were introduced to a container and subjected to mechanical mixing by using a pin mill so that the surface of the primary particles of lithium titanium oxide (LTO) may be coated with $Al_2O_3$.

Then, the LTO primary particles coated with $Al_2O_3$ was introduced to distilled water to prepare a spray solution. The spray solution was supplied to a chamber of a spray dryer and subjected to spray drying in the chamber so that it may be dried. Herein, the spray drying condition was controlled to a drying temperature of 130° C., internal pressure of −20 mbar and a flow rate of 45 mL/minute. After carrying out the spray drying, MO-LTO secondary particles were obtained. The secondary particles were formed by aggregation of the primary particles. After that, the secondary particles were fired under reductive atmosphere ($N_2$) at 700° C. for 10 hours.

MO-LTO secondary particles were obtained through the above-described process. The MO-LTO secondary particles include the primary particles and secondary particles coated with the metal oxide at least partially on the surfaces thereof.

Manufacture of Battery

Example 1

The MO-LTO secondary particles obtained as described above were used as a negative electrode active material. The secondary particles, a conductive material (carbon black) and a binder (PVDF) were introduced to NMP at a weight ratio of 90:5:5, followed by mixing, to provide a negative electrode mixture. Next, the resultant negative electrode mixture was coated on copper foil (thickness: 20 μm) as a current collector to a thickness of 60 μm and then dried to obtain a negative electrode.

Then, $LiMnO_2$, a conductive material (carbon black) and a binder (PVDF) were introduced to NMP at a weight ratio of 90:5:5, followed by mixing, to provide positive electrode slurry. Next, the positive electrode slurry was coated on an aluminum current collector to a thickness of 75 μm to provide a shape of thin electrode plate, which, in turn, was dried at 135° C. for 3 hours or more and rolled to obtain a positive electrode.

Then, a separator (separator made of polyethylene, thickness: 16 μm) was interposed between the negative electrode and the positive electrode to provide an electrode assembly. After that, the electrode assembly was received in a battery casing and an electrolyte containing 1M $LiPF_6$ and an organic solvent (ethylene carbonate: methyl ethyl carbonate=2:1 on the volume basis) was injected thereto to obtain a full cell.

Comparative Example 1

A battery was manufactured in the same manner as Example 1, except that lithium titanium oxide (Posco, T30D8) was used as a negative electrode active material.

Comparison of Gas Generation

Example 2

5 g of the MO-LTO obtained as described above was dipped in an organic solvent (ethylene carbonate: methyl ethyl carbonate=2:1 on the volume basis) containing 1M LiPF$_6$ and was allowed to stand for 72 hours.

Comparative Example 2

5 g of lithium titanium oxide (Posco, T30D8) was dipped in an organic solvent (ethylene carbonate: methyl ethyl carbonate=2:1 on the volume basis) containing 1M LiPF$_6$ and was allowed to stand for 72 hours.

Figure 2:
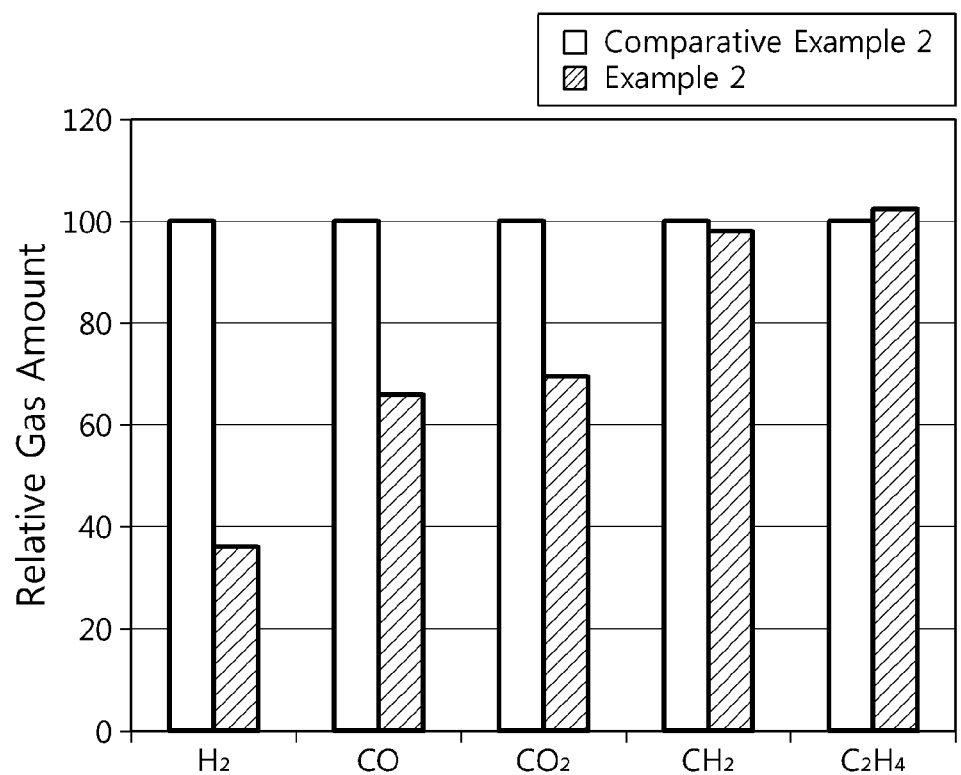
FIG. 2 is a graph illustrating the amount of gas generation of Example in comparison to that of Comparative Example.

The type and amount of gas generated from Example 2 and Comparative Example 2 were analyzed. The results are shown in FIG. 2. It can be seen from the results that Example 2 according to the present disclosure shows a decrease in gas generation as compared to Comparative Example 2.

Evaluation of Output at Room Temperature

Figure 3:
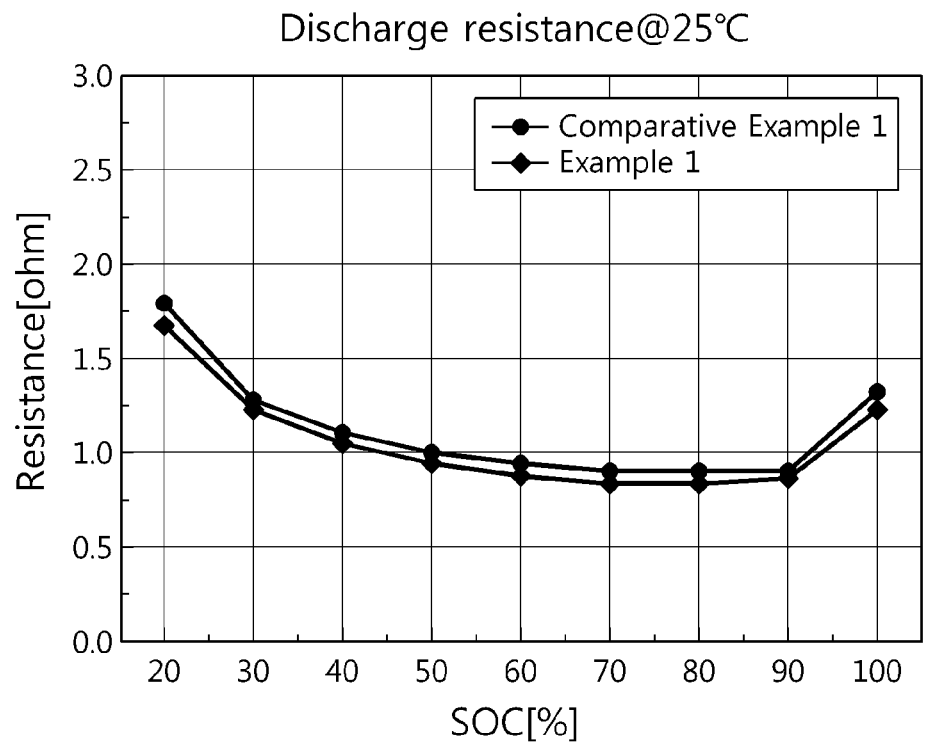
FIG. 3 is a graph illustrating the resistance characteristics of Example in comparison to that of Comparative Example.
Figure 4:
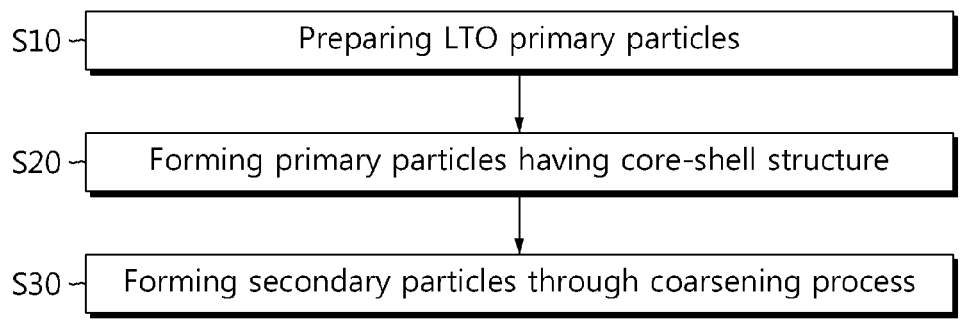
FIG. 4 is a flow chart illustrating a process for preparing the LTO composite particles according to an embodiment of the present disclosure.

Each of the batteries according to Example 1 and Comparative Example 1 was determined for a resistance value as a function of state of charge (SOC) at 25° C. under the conditions of a voltage of 2.1-2.9V and a current of 100 A-200A. The results are shown in FIG. 3.

The MO-LTO particles coated with LTO particles as a metal oxide according to the present disclosure have a BET specific surface area increased by 36% as compared to the BET specific surface area of Comparative Example. Thus, it is thought that the MO-LTO particles according to the present disclosure provide a gas generation amount reduced by about 31% as compared to the conventional LTO particles. Herein, BET specific surface area of particles was measured with a specific surface area measuring system (Jmini 2310 available from Shimazu Corporation) through the BET method by adsorbing nitrogen gas to each of the particles.

What is claimed is:

1. A negative electrode for an electrochemical device which comprises:
   a current collector; and
   an electrode active material layer formed on at least one surface of the current collector,
   wherein the electrode active material layer comprises a metal oxide-lithium titanium oxide (MO-LTO) composite particles which have a shape of secondary particles formed by aggregation of primary particles, wherein the primary particles have a core-shell structure comprising a core and a shell totally or at least partially covering a surface of the core, the core comprises primary particles of lithium titanium oxide (LTO), and the shell comprises a metal oxide,
   wherein the shell is an outer layer of the primary particles, and
   wherein the electrode active material layer comprises the MO-LTO composite particles and a content of the secondary particles thereof is 80 wt% or more.

2. The negative electrode for an electrochemical device according to claim 1, wherein the primary particles of lithium titanium oxide (LTO) has a chemical composition represented by the following Chemical Formula 1:

$$Li_xTi_yO_zM_w$$ [Chemical Formula 1]

Wherein M is any one selected from the group consisting of Zr, B, Sn, S, Be, Ge and Zn, or a combination of two or more of them, 0.5≤x≤3, 1≤y≤5, 2≤z≤12, and 0≤w<0.1.

3. The negative electrode for an electrochemical device according to claim 1, wherein the metal oxide is an oxide of a metal selected from the group consisting of Al, Zr, B, Li and Ti.

4. The negative electrode for an electrochemical device according to claim 1, wherein the metal oxide is at least one selected from the group consisting of Al$_2$O$_3$ and ZrO$_2$.

5. The negative electrode for an electrochemical device according to claim 1, wherein the primary particles have a D$_{50}$ (volume-based density distribution) of 0.1-1 μm.

6. The negative electrode for an electrochemical device according to claim 1, wherein the secondary particles have a D$_{50}$ (volume-based density distribution) of 2-50 μm.

7. An electrochemical device which comprises a negative electrode, a positive electrode, a separator interposed between the negative electrode and the positive electrode and an electrolyte, wherein the negative electrode is defined in claim 1.

8. The electrochemical device according to claim 7, which is a lithium ion secondary battery or a hybrid super capacitor.

* * * * *